I. T. SMITH.
Bale-Tie.

No. 159,463.

Patented Feb. 2, 1875.

Witnesses;
Jas. J. Duhamel
Thomas Byrne

Inventor;
Isaac T. Smith,
Per H. S. Abbot,
Attorney.

UNITED STATES PATENT OFFICE.

ISAAC T. SMITH, OF RICHMOND, VIRGINIA.

IMPROVEMENT IN BALE-TIES.

Specification forming part of Letters Patent No. 159,463, dated February 2, 1875; application filed December 3, 1874.

*To all whom it may concern:*

Be it known that I, ISAAC T. SMITH, of Richmond, in the county of Henrico and State of Virginia, have invented certain new and useful Improvements in Bale-Ties; and I do hereby declare the following to be a full, clear, and exact description thereof, reference being had to the accompanying drawing and to the letters of reference marked thereon.

The nature of my invention consists in an open double hook formed with V-shaped recesses to receive the ends of the baling-wire, as will be hereinafter more fully set forth.

In order to enable others skilled in the art to which my invention appertains to make and use the same, I will now proceed to describe its construction and operation, referring to the annexed drawing which forms a part of this specification, and in which—

Figure 1:
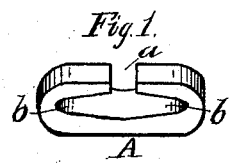
Figure 2:
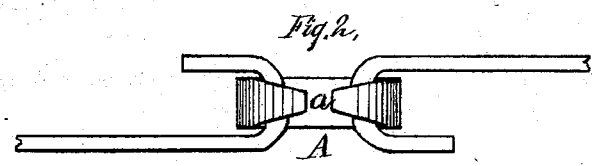
Figure 3:
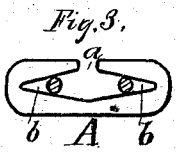

Figure 1 is a perspective view of my baletie. Fig. 2 is a plan view of the tie, showing the wire fastened therein. Fig. 3 is a side view of the tie.

My bale-tie is made of a single piece, A, of wrought-iron, malleable iron, or other suitable material, having its ends bent over on top, forming a double hook with a central opening, $a$, at the top. From the center are thus formed two recesses, $b$ $b$, which are V-shaped, they being wider at the center of the tie than at the ends, both sides of the recesses being equally or nearly equally inclined, as shown in Fig. 3.

When the bale is pressed and the wire passed around the same the ends of the wire are bent and passed through the central top opening, $a$, into the V-shaped recesses $b$ $b$. When the pressure is removed from the bale the bale at once expands, drawing the wires into the V-shaped recesses and pinching them tightly therein, so that they cannot slip out from the same.

Having thus fully described my invention, what I claim as new, and desire to secure by Letters Patent, is—

The double-hook tie A, having central top opening, $a$, and V-shaped recesses $b$ $b$, substantially as and for the purposes herein set forth.

ISAAC T. SMITH.

Witnesses:
I. S. TOWER,
JNO. J. CREER.